United States Patent [19]

Hensley, Jr. et al.

[11] Patent Number: 4,483,764

[45] Date of Patent: Nov. 20, 1984

[54] HYDROCARBON CONVERSION PROCESS

[75] Inventors: Albert L. Hensley, Jr., Munster, Ind.; Jeffrey T. Miller, Naperville, Ill.; Thomas D. Nevitt, Naperville, Ill.; A. Martin Tait, Naperville, Ill.

[73] Assignee: Standard Oil Company (Indiana), Chicago, Ill.

[21] Appl. No.: 545,903

[22] Filed: Oct. 27, 1983

Related U.S. Application Data

[62] Division of Ser. No. 320,866, Nov. 13, 1981, Pat. No. 4,460,698.

[51] Int. Cl.$^3$ .................. C10G 11/05; C10G 45/12; C10G 47/20
[52] U.S. Cl. .................................. 208/111; 208/114; 208/213; 208/251 H; 208/254 H
[58] Field of Search ........... 208/114, 111, 213, 251 H, 208/254 H

[56] References Cited

U.S. PATENT DOCUMENTS

| | | | |
|---|---|---|---|
| 3,649,523 | 3/1972 | Bertolacini et al. | 208/111 |
| 3,749,663 | 7/1973 | Mickelson | 208/110 |
| 4,259,537 | 3/1981 | Chu | 585/467 |
| 4,278,827 | 7/1981 | Chu et al. | 585/467 |
| 4,395,328 | 7/1983 | Hensley, Jr. et al. | 208/251 H |

Primary Examiner—Delbert E. Gantz
Assistant Examiner—O. Chaudhuri
Attorney, Agent, or Firm—James R. Henes; William T. McClain; William H. Magidson

[57] ABSTRACT

Hydrocarbon conversion process catalyst comprising an active metallic component comprising at least one metal having hydrocarbon conversion activity and at least one oxygenated phosphorus component, and a support component comprising at least one porous refractory inorganic oxide matrix component and at least one crystalline molecular sieve zeolite component.

2 Claims, No Drawings

HYDROCARBON CONVERSION PROCESS

This is a division of application Ser. No. 320,866, filed Nov. 13, 1981, now U.S. Pat. No. 4,460,698.

BACKGROUND OF THE INVENTION

This invention relates to improved catalytic compositions having utility in hydrocarbon conversion processes. In a specific aspect, the invention relates to improved catalytic compositions having utility in hydrogen treating of hydrocarbon feed materials.

Catalytic compositions containing a catalytically active metallic component deposed on a non-zeolitic, refractory inorganic oxide support are well known as are numerous uses therefor. Familiar examples include petroleum and synthetic crude oil hydrotreating and hydrocracking catalysts comprising a Group VIB and/or VIII metal such as cobalt, nickel molybdenum and/or tungsten deposed on a non-zeolitic, refractory inorganic oxide such as alumina, silica, magnesia, etc. and olefin polymerization catalysts comprising a Group VIB metal deposed on silica or silica-alumina supports.

It also is known that the activity or performance of catalysts of the type described hereinabove for reactions such as hydrocracking, disproportionation and oligomerization can be improved or modified by inclusion in the catalyst of a crystalline molecular sieve zeolite component. Thus U.S. Pat. No. 3,649,523 (Bertolacini et al.) discloses a hydrocarbon conversion process, and particularly hydrocracking and disproportionation of petroleum hydrocarbon feed materials, carried out in the presence of improved catalysts comprising a metallic component having hydrogenating activity deposed on a support component comprising a large pore crystalline aluminosilicate and a porous support material such as alumina, silica or aluminum phosphate. U.S. Pat. No. 3,894,930 and U.S. Pat. No. 4,054,539 (both Hensley) disclose hydrocracking in the presence of improved catalysts comprising a metallic hydrogenating component and a support component comprising ultrastable large pore crystalline aluminosilicate and silica-alumina. U.S. Pat. No. 3,876,522 (Campbell et al.) discloses preparation of lube oils by a process that includes a hydrocracking step in which there are employed catalysts containing a composite of a crystalline aluminosilicate zeolite component and a porous refractory oxide component such as alumina or silica, such composite containing deposited or exchanged catalytic metals. U.S. Pat. No. 4,029,601 (Wiese) discloses oligomerization of alkenes using a cobalt oxide-active carbon composite supported on a refractory oxide such as silica or alumina and/or crystalline aluminosilicate zeolites. Other processes in which catalysts comprising catalytically active metals and a support component comprising a porous oxide and a crystalline molecular sieve zeolite are useful include isomerization of alkylaromatics and alkylation of aromatics and paraffins.

It also is known that the performance of various catalysts containing catalytically active metals deposed on a non-zeolitic, refractory inorganic oxide support component can be improved or modified by inclusion of phosphorus in the catalytically active metallic component or through the use of phosphorus compounds in catalyst preparation. For example, U.S. Pat. No. 3,287,280 (Colgan et al.) discloses that the use of phosphoric acid solutions of nickel and/or molybdenum salts to impregnate non-zeolitic supports such as alumina or silica leads to improved dispersion of catalytically active metals on the support surface and improved results in hydrodesulfurization of petroleum hydrocarbon feeds. The patentee also discloses that phosphoric acid residues remaining in the catalyst impart thermal stability thereto. U.S. Pat. No. 3,840,472 (Colgan) contains a similar disclosure with respect to the use of phosphoric acid impregnating solutions of active metal salts. U.S. Pat. No. 4,165,274 (Kwant) discloses a two-step process for hydrotreating and hydrocracking tar sands oils wherein hydrotreating takes place in a first stage in the presence of an alumina-supported, fluorine and phosphorus-containing nickel-molybdenum catalyst, after which hydrocracking is conducted in the presence of a catalyst-containing nickel and tungsten supported on a low-sodium, Y-type molecular sieve support component. U.S. Pat. No. 3,985,676 (Rekers et al.) discloses catalysts for polymerization of olefins prepared by deposition of various organophosphorus compounds of chromium onto high surface area non-zeolitic supports such as silica or silica-alumina followed by thermal activation of the result.

Notwithstanding similarities in the basic catalytic composition—catalytically active metal component deposed on non-zeolitic refractory inorganic oxide support component—into which phosphorus or crystalline molecular sieve zeolite components have been incorporated according to the above-described proposals, the reported effects of the zeolite and phosphorus components are, in many respects, sufficiently unrelated as to mitigate against attempting to combine the effects of the components into a single catalyst. For example, the improved hydrocracking activity of the above-described zeolite-containing catalysts typically would not be desired in a hydrodesulfurization or hydrodenitrogenation catalyst because in typical hydrotreating processes employing such catalysts, it is preferred to limit cracking. Similarly, the improved hydrodesulfurization activity of phosphorus-promoted catalysts such as those of Colgan et al. would be of little consequence within the context of a cracking, alkylation, isomerization or disproportionation process. On the other hand, we have previously found that a phosphorus component incorporated into the hydrogenating component of certain hydrotreating catalysts exerts a promotional effect with respect to denitrogenation of high nitrogen feeds while crystalline molecular sieve zeolite components incorporated into catalysts containing similar active metals but free of phosphorus exerts a promotional effect with respect to denitrogenation and hydrocracking reactions.

It also is known from Rabo, *Zeolite Chemistry And Catalysis*, ACS Monograph 171, American Chemical Society, pages 294–297 (1976), that many crystalline molecular sieve zeolites possess only limited stability with respect to strong acids such as the phosphoric acid used according to Colgan et al. Accordingly, it can be speculated that attempts to combine the promotional effects of phosphoric acid and crystalline molecular sieve zeolites have been limited by concern over destruction of the zeolite component.

U.S. Pat. No. 3,617,528 (Hilfman), which is directed to preparation of supported nickel-containing catalysts by coextrusion of a phosphoric acid solution of nickel or nickel and Group VIB metal compounds and an alumina-containing carrier, suggests the use of carriers containing silica and alumina that are amorphous or zeolitic in nature. Column 2 lines 39–43. Crystalline aluminosilicate zeolites specifically disclosed by Hilfman are mordenite, faujasite and Types A and U molecular sieves. Column 3 lines 42–46. Hilfman does not address the effect of the acid on zeolite integrity or crystallinity, nor is there any disclosure or suggestion as to whether any zeolite employed in the disclosed preparations would remain intact in the final catalyst. In fact, none of the disclosed crystalline aluminosilicate zeolites, or any other for that matter, is employed in the patentee's examples. Further, U.S. Pat. No. 3,706,693 (Mickelson et al. '693) and U.S. Pat. No. 3,725,243 (Hass et al.) teach that exposure of zeolites to strong acids such as phosphoric acid destroys zeolite crystallinity and integrity. In fact, both Mickelson et al. '693 and Hass et al. are directed specifically to catalyst preparations in which impregnation of crystalline aluminosilicate-containing supports with phosphoric acid solutions of salts of hydrogenating metals results in destruction of zeolite crystallinity. Further, three of the four crystalline aluminosilicate zeolites specifically disclosed by Hilfman (faujasite, mordenite and Type A molecular sieve) are included among the crystalline aluminosilicate zeolites that are preferred for use in Mickelson et al.'s and Hass et al.'s zeolite-destructive preparations. The aforesaid Rabo publication teaches that among Zeolite A, faujasite and mordenite, only the latter exhibits appreciable acid stability.

U.S. Pat. No. 3,905,914 (Jurewicz et al.) is directed to preparation of oxidation catalysts by mixing a vanadium compound, zirconium salt and hydrogen halide, and then adding phosphoric acid or a compound hydrolyzable to phosphoric acid. The result is refluxed to form a gel which then is dried, or "used to impregnate a suitable carrier, such as alumina, alundum, silica, silicon carbide, silica-alumina, zirconia, zirconium phosphate and/or a zeolite." Column 2 lines 47–51. Jurewicz et al. does not identify any zeolites nor do the patentee's examples illustrate preparation of a supported catalyst. Also, no consideration is given to acid stability of zeolites and there is no indication whether any zeolite used in the disclosed catalyst preparation would remain intact.

Similar to the Mickelson et al. '693 and Hass et al. patents discussed hereinabove, U.S. Pat. Nos. 3,749,663, 3,749,664 and 3,755,150 (all Mickelson) are directed to impregnation of support materials with phosphoric acid solutions of salts of catalytically active metals. Although none of these patents discloses impregnation of support materials containing a zeolite component, each patent expressly cautions against exposure of supports containing aluminum ions to phosphoric acid at relatively low pH stating that reaction of the acid and aluminum degrades the support, fouls the impregnating solution and results in formation of undesirable chemical forms in the finished catalyst. (See Mickelson '663 at Column 8 lines 60–69, Mickelson '664 at Column 8 lines 6–15, Mickelson '150 at Column 9 lines 12–21.)

U.S. Pat. No. 3,836,561 (Young) also deals with acid treatment of crystalline aluminosilicate zeolites. According to Young, alumina-containing compositions, including those containing crystalline aluminosilicate zeolites, are reacted with aqueous acids including hydrochloric, sulfuric, nitric, phosphoric and various organic acids, at a pH below about 5 in the presence of an ionizable salt that is soluble in the aqueous phase, and then the result is washed, dried and calcined. The result of such treatment is removal of aluminum from the alumina-containing composition, replacement thereof with metallic cations if the ionizable salt is one containing cations that can be exchanged into the zeolite, increased porosity and decreased bulk volume of the catalyst. The resulting compositions are said to have utility as absorbents, ion exchange resins, catalysts and catalyst supports. Acid-stable zeolites and the effects of acid treatment on zeolite crystallinity are discussed at Column 2 lines 61–68. Of course, Young's acid treatment differs from the use of phosphoric acid according to the patents discussed hereinabove in that Young's purpose is to remove aluminum from the composition rather than to incorporate phosphorus into it. It also differs from the patents discussed hereinabove in that the disclosed compositions lack a catalytically-active metallic component deposed on the alumina-containing carrier.

Other patents and publications that may be of interest to the present invention in disclosing treatment of crystalline molecular sieve zeolites or compositions containing the same with phosphoric acid and other phosphorus compounds to incorporate phosphorus into the zeolite are U.S. Pat. No. 3,962,364 (Young) and U.S. Pat. Nos. 4,274,982, 4,276,437 and 4,276,438 (all Chu). According to these patents, suitable phosphorus compounds include halides, oxyhalides, oxyacids and organophosphorus compounds such as phosphines, phosphites and phosphates. Incorporation of phosphorus according to these patents is reported to improve paraselectivity in alkylation reactions. Chu '982 further discloses treatment of the phosphorus-containing zeolites with magnesium compounds. Chu '437 discloses impregnation of the phosphorus treated compositions with solutions of gallium, iridium or thallium compounds. Chu 438 contains a similar disclosure with respect to impregnation of compounds of silver, gold and copper. Both patents disclose use of acid solutions of the metals as impregnating solutions, with hydrochloric, sulfuric and nitric as well as various organic acids being disclosed. None of these patents discloses or suggests the use of phosphoric acid impregnating solutions nor is there any suggestion of a catalyst containing an active metallic component which contains phosphorus. Rather, the respective patentees' phosphorus is incorporated into the zeolite.

British No. 1,555,928 (Kouwenhaven et al.) discloses crystalline silicates of specified formula having utility in a wide range of hydrocarbon conversions. Impregnation of the silicates with catalytic metals is disclosed as is promotion or modification with halogens, magnesium, phosphorus, boron, arsenic or antimony, (Page 6 lines 33–54); with incorporation of phosphorus into the silicate to improve alkylation selectivity, as in the above-described Chu patents, being specifically disclosed.

It also is known that phosphine or other organophosphorus complexes of various metal salts can be employed in preparation of various supported catalyst compositions. For example, U.S. Pat. No. 3,703,561 (Kubicek et al.) discloses catalysts for olefin disproportionation comprising a reaction product of (1) an organoaluminum halide, aluminum halide or combination thereof with each other or with another organometallic halide and (2) a mixture of a salt of copper, silver or gold with a complexing agent which may be an organophosphine. Reaction of components (1) and (2) is conducted in the presence of a solvent for the reactants, in the substantial absence of air and at temperatures low enough to avoid decomposition of the reactants. It also is disclosed to provide the catalysts in supported form by impregnating a support such as a non-zeolitic, refractory inorganic oxide or a zeolite with the reaction product, or by impregnation with one of the reactants followed by addition of the other. Kubicek et al. also states that if such supported catalysts are to be activated by calcination the calcination should take place prior to impregnation with the active species, i.e., the reaction product of components (1) and (2). It is unclear whether residues of any organophosphine compound used in preparation of the catalysts of Kubicek et al. would remain in association with the active metallic species. In any event, the catalyst preparation according to this patent is conducted under conditions designed to avoid conversion of any such organophosphine residues to an oxygenated phosphorus component such as that required according to the present invention.

U.S. Pat. No. 3,721,718 (Hughes et al.) and U.S. Pat. No. 4,010,217 (Zuech) contain disclosures similar to that of Kubicek et al. with respect to use of organophosphorus complexes of various metal salts in preparation of olefin disproportionation catalysts. Like Kubicek et al., both Hughes et al. and Zuech contemplate supported catalysts; however, both patentees also state that if activation by calcination is desired, it should be accomplished by calcination of support prior to incorporation of active metals.

Another patent disclosing the use of metal complexes in catalyst preparation is U.S. Pat. No. 3,849,457 (Haag et al.) which is directed to preparation of carboxylic acids by hydrogenolysis of esters. The catalysts of Haag et al. comprise a hydrogenating metal component and a solid acid component such as a zeolite which components may be employed as a loose physical admixture or by combining the two components into a single particle. Various methods for combining the two components into a single particle are disclosed at Column 6 line 64-Column 7 line 44. One of these involves mixing a solution of a metal pi-complex with the acid solid and then decomposing the complex to form elemental metal and depositing the elemental metal onto the acid solid. A specific metal complex employed in this preparative scheme is tetra(triphenylphosphine)palladium(II) dibromide. Another preparative method useful with respect to zeolitic acid solid components involves incorporation of the hydrogenation component by conventional methods such as ion exchange or impregnation. None of the disclosed methods would result in association of an oxygenated phosphorus component with the metallic component of the patentees' catalyst.

U.S. Pat. No. 4,070,403 (Homeier) discloses a hydroformylation catalyst comprising a cobalt compound and a zeolite-alumina hydrosol dispersion. The cobalt compound is chemically bonded to the alumina-zeolite dispersion by a vapor-phase impregnation technique. Suitable cobalt components of the disclosed catalysts include various salts such as halides, nitrate and various carboxylates as well as organophosphine complexes. Homeier does not disclose or suggest the presence of an oxygenated phosphorus component in the final catalyst, nor does the patentee attribute any promotional effect to phosphorus.

It can be appreciated from the foregoing that efforts to include both a crystalline molecular sieve zeolite component and a phosphorus component in catalysts comprising an active metal component deposed on a non-zeolitic refractory inorganic oxide component in such a manner that the promotional effects of both the phosphorus and the zeolite are retained have been largely unsuccessful. In those instances in which an attempt has been made to incorporate a promoting phosphorus component through the use of phosphoric acid impregnating solutions of compounds of active metals, such use of phosphoric acid in conjunction with a crystalline aluminosilicate zeolite-containing composition often results in destruction of the crystalline aluminosilicate zeolite component. Other proposals such as those involving use of organophosphorus complexes of various metal salts to aid impregnation or deposition of active metals into or onto support result in only incidental, if any, incorporation of phosphorus into the final catalyst, and phosphorus so incorporated appears lacking in promotional effect.

It would be desirable to provide an improved catalytic composition in which both phosphorus and crystalline molecular sieve zeolite components are present in a form capable of exerting a promotional effect. It is an object of this invention to provide an improved catalytic composition. A further object of the invention is to provide for the use of such catalytic compositions in hydrocarbon conversion processes. A still further object is to provide for the preparation of catalysts in which improved performance is attained through incorporation of crystalline molecular sieve zeolite and phosphorus components. Other objects of the invention will be apparent to persons skilled in the art from the following description and the appended claims.

We have now found that the objects of this invention can be attained by incorporation of an oxygenated phosphorus component into the catalytically active metallic component of a catalytic composition and incorporation of selected crystalline molecular sieve zeolite components into the support component of the composition. Advantageously, the crystalline molecular sieve zeolite components of the invented catalysts are derived from acid-tolerant crystalline molecular sieve zeolites, and accordingly, phosphorus component can be incorporated without substantial destruction of zeolite integrity or crystallinity. Further, the phosphorus component is incorporated into the metallic component in a form capable of exerting a promotional effect. Thus, as demonstrated in the examples appearing hereinbelow, the catalysts of the invention, wherein an oxygenated phosphorus component is incorporated into a catalytically active metallic component which is deposed on or associated with a support component comprising at least one crystalline molecular sieve zeolite component and a non-zeolitic, refractory inorganic oxide matrix component, are superior to catalyst compositions that are identical but for the inclusion of a phosphorus component, or but for inclusion of the zeolite component, in a variety of catalytic processes. Accordingly, the overall effect of the phosphorus and zeolite components on performance of the basic catalytically active composition comprising a metallic component and a non-zeolitic, refractory inorganic oxide component is greater than the effect of either component alone in a variety of reactions.

In addition to the patents and publications discussed hereinabove, U.S. Pat. No. 4,228,036 (Swift et al.), and U.S. Pat. No. 4,277,373 (Sawyer et al.) may be of interest to the present invention in disclosing catalytic compositions containing phosphorus and zeolite components. Specifically, Swift et al. discloses an improved catalytic cracking catalyst comprising an alumina-aluminum phosphate-silica matrix composited with a zeolite component having cracking activity, such as a rare earth-exchanged Y-type crystalline aluminosilicate zeolite. Swift et al. does not disclose inclusion of an active metallic component into such catalysts. Further, in contrast to the catalysts of the present invention, wherein an oxygenated phosphorus component is included in an active metallic component, the phosphorus component of Swift et al.'s catalysts is included in a refractory oxide material.

Sawyer et al. discloses hydroprocessing catalysts comprising a Group VIB and/or VIII metal component composited with an ultrastable Y-type crystalline aluminosilicate zeolite and an alumina-aluminum fluorophosphate component. The catalyst also may contain an alumina gel-containing matrix. Although an essential component of Sawyer et al.'s catalyst is the aluminum fluorophosphate component of the support, it also is to be noted that patentee discloses use of phosphomolybdic acid to impregnate a support containing a Y-type crystalline aluminosilicate and alumina-aluminum fluorophosphate in Example 1 (see Column 5 lines 21-25). According to the example, however, it appears that there was no incorporation of a phosphorus component into the active metal component of the catalyst because the table at Column 5 lines 42-52 fails to report phosphorus content other than that contained in the aluminum fluorophosphate component of the support. Table 2 of Sawyer et al. also reports on a comparative catalyst C containing specified levels of alumina, Y-type zeolite, nickel oxide, molybdenum oxide, and phosphorus pentoxide. For catalyst C to have been a fair comparator for the catalysts of Sawyer et al.'s invention, the phosphorus pentoxide component must have been present in a manner similar to the fluorophosphate component of the patentees' catalysts, i.e., as part of the support. As such, Sawyer et al. fails to disclose or suggest a catalyst containing phosphorus as an essential part of the active metal component.

DESCRIPTION OF THE INVENTION

Briefly, the catalyst composition of this invention comprises (1) an active metallic component comprising at least one metal having hydrocarbon conversion activity and at least one oxygenated phosphorus component; and (2) a support component comprising at least one non-zeolitic, refractory inorganic oxide matrix component and at least one crystalline molecular sieve zeolite component. According to a further aspect of the invention, such catalytic compositions are prepared by a method comprising (1) impregnating a support component comprising at least one non-zeolitic, refractory inorganic oxide matrix component and at least one acid-tolerant, crystalline molecular sieve zeolite component with precursors to an active metallic component comprising at least one metal having hydrocarbon conversion activity and at least one oxygenated phosphorus component under conditions effective to retain substantial zeolite crystallinity; and (2) calcining the result to convert active metallic component precursors to active form. According to a still further aspect of the invention, the above-described catalytic compositions are employed in hydrocarbon conversion processes in which a hydrocarbon-containing chargestock is contacted with the catalytic composition under hydrocarbon conversion conditions.

In greater detail, the invented catalytic composition comprises an active metallic component and a support component. Relative proportions of these are not critical so long as the active metallic component is present in at least a catalytically effective amount. Optimum proportions for a given catalyst will vary depending on intended use. Usefully, the active metallic component constitutes about 5 to about 50 wt % and the support constitutes about 50 to about 95 wt %, such weight percentages being based upon total weight of the catalytic composition.

The active metallic component of the invented catalyst comprises at least one metal having hydrocarbon conversion activity and at least one oxygenated phosphorus component. Suitable metals having hydrocarbon conversion activity include any of the metals typically employed to catalyze hydrocarbon conversion reactions such as those of Groups IB, II, IIIB–VIIB and VIII. These can be present in the catalyst in elemental form, as oxides, as sulfides, or in other active forms. Combinations also are contemplated. The Group VIB metals exhibit a high degree of susceptibility to promotion by oxygenated phosphorus component. Accordingly, preferred compositions are those in which the active metallic component comprises at least one Group VIB metal.

For a given catalyst, the preferred metal or combination of metals of the active metallic component will vary depending on end use. For example, in hydrogen processing of hydrocarbon feed materials such as petroleum or synthetic crude oils, coal or biomass liquids, or fractions thereof, preferred metals are those of Groups VIB and VIII such as chromium, molybdenum, tungsten, nickel, cobalt, iron, platinum, rhodium, palladium, iridium and combinations thereof. Oxides and sulfides of these are most preferred from the standpoint of catalytic performance. In processes for denitrogenation hydrotreating or denitrogenation hydrocracking, combinations of nickel and molybdenum and combinations of nickel or cobalt with molybdenum and cLromium give particularly good results as discussed in in copending, commonly assigned U.S. Pat. No. 4,431,527 of J. T. Miller et al. filed concurrently herewith. Particularly good results in hydrocracking processes are attained using catalysts containing combinations of cobalt and molybdenum, nickel and molybdenum, or nickel and tungsten as the metals of the active metallic component as discussed in detail in copending, commonly assigned U.S. Pat. No. 4,431,516 of M. J. Baird et al. filed concurrently herewith. In mild hydrocracking processes such as catalytic dewaxing and catalytic cracker feed hydrocracking processes, preferred metals of the metallic component are combinations of nickel and molybdenum as discussed in detail in copending, commonly assigned U.S. Pat. No. 4,431,517 of T. D. Nevitt et al. filed concurrently herewith.

In addition to the above-described catalytically active metal component, the active metallic component of the invented composition contains at least one oxygenated phosphorus component which may be present in a variety of forms such as one or more simple oxides, phosphate anions, complex species in which phosphorus is linked through oxygen to one or more metal or metals of the active metallic component or compounds of such metal or metals, or combinations of these. The specific form of the oxygenated phosphorus component is not presently known; accordingly, for purposes hereof, phosphorus contents are calculated and expressed in terms of $P_2O_5$.

Content of the metal and phosphorus components of the active metallic component are not critical although phosphorus component preferably is present in at least an amount effective to promote hydrocarbon conversion activity of the metal or metals of the metallic component. In general, the metal or metals of the metallic component, calculated as oxide of the metal or metals in a common oxidation state, e.g., $Cr_2O_3$, $MoO_3$, $WO_3$, NiO, CoO, make up about 3 to about 45 wt. % of the total catalyst weight while phosphorus component, expressed as $P_2O_5$, makes up about 0.1 to about 20 wt. % of the total catalyst. Within these broad ranges, preferred levels of metal and phosphorus component will vary depending on end use. For example, catalysts useful in hydrogen processing of petroleum or synthetic crude oils, coal or biomass liquids, or fractions thereof preferably contain about 5 to about 35 wt. % Group VIB and/or VIII metal, expressed as common metal oxide, and about 0.5 to about 15 wt. % oxygenated phosphorus component, expressed as $P_2O_5$. Of course, higher and lower levels of metal and/or phosphorus component can be present; however, below about 5 wt. % metal oxide, hydrogenation activity can suffer while above about 35 wt. %, improvements in activity typically do not compensate for the cost of the additional metal. Similarly, below about 0.5 wt. % phosphorus component, calculated as $P_2O_5$, promotional effect may be insignificant while above about 15 wt. %, the phosphorus component may adversely affect hydrogenation activity or performance.

The support component of the invented catalytic composition comprises a non-zeolitic, refractory inorganic oxide matrix component and at least one crystalline molecular sieve zeolite component. Suitable non-zeolitic, refractory inorganic oxide matrix components are well known to persons skilled in the art and include alumina, silica, silica-alumina, alumina-silica, magnesia, zirconia, titania, etc., and combinations thereof. The matrix component also can contain adjuvants such as phosphorus oxides, boron oxides, fluorine and/or chlorine. Matrix components that are preferred are those comprising alumina, owing to the availability and strength thereof. More preferably, the matrix component is alumina, or a combination of alumina and silica.

The support component of the invented catalytic composition also comprises at least one crystalline molecular sieve zeolite component. This component of the support component is derived from at least one acid-tolerant crystalline molecular sieve zeolite. For purposes hereof, an acid-tolerant crystalline molecular sieve zeolite is defined as one that retains substantial crystallinity on exposure to phosphoric acid at pH down to about 3 to 4 and contains sufficiently low levels of cations capable of reacting with aqueous phosphoric acid to form insoluble metal phosphates capable of plugging the zeolite's pores as to avoid substantial plugging. Both naturally occurring and synthetic zeolites are contemplated. As with the metals of the metallic component of the invented catalysts, the specific zeolite component to be included in a given catalyst will vary depending on intended use of the catalytic composition. Examples of acid-tolerant, crystalline molecular sieve zeolites include faujasite-type crystalline aluminosilicate zeolites selected from the ultrastable Y-type crystalline aluminosilicate zeolites and Y-type crystalline aluminosilicate zeolites in acid and ammonium forms, AMS-type crystalline borosilicate zeolites, ZSM-type crystalline aluminosilicate zeolites and mordenite-type crystalline aluminosilicate zeolites.

The ultrastable crystalline aluminosilicate zeolites typically are faujasite-type zeolites that exhibit improved stability at elevated temperatures, such stability being imparted by exchanging original alkali metal cations with ammonium salt, calcining to convert the zeolite to hydrogen form, steaming or calcining again, exchanging with ammonium salt once again and finally calcining. Specific examples of ultrastable Y-type crystalline aluminosilicate zeolites include zeolite Z-14US, which is described in detail in U.S. Pat. No. 3,293,192 (Maher et al.) and U.S. Pat. No. 3,449,070 (McDaniel et al.), both of which are incorporated herein by reference. Y-type crystalline aluminosilicate zeolites in hydrogen or ammonium form also exhibit sufficient acid-tolerance as to be suitable for purposes of the present invention. When used in preparation of catalysts, Y-type zeolites in ammonium form are converted to acid form.

Crystalline borosilicate zeolites of the AMS-type are described in detail in commonly assigned U.S. Pat. No. 4,269,813 (Klotz), which is incorporated herein by reference. A specific example of this material is crystalline borosilicate zeolite AMS-1B which corresponds to the formula:

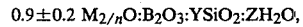

$0.9 \pm 0.2\ M_{2/n}O:B_2O_3:YSiO_2:ZH_2O$, wherein M is at least one cation having a valance of n, Y ranges from 4 to about 600 and Z ranges from 0 to about 160. AMS-1B provides an X-ray pattern that comprises the following X-ray diffraction lines and assigned strengths:

| d (Å) | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M |

Crystalline aluminosilicate zeolites of the ZSM-type are well known and typically contain silica and alumina in a molar ratio of at least 12:1 ($SiO_2:Al_2O_3$) and have average pore diameters of at least about 5 Å. Specific examples of crystalline aluminosilicate zeolites of the ZSM-type include crystalline aluminosilicate zeolite ZSM-5, which is described in detail in U.S. Pat. No. 3,702,886; crystalline aluminosilicate ZSM-11, which is described in detail in U.S. Pat. No. 3,709,979; crystalline aluminosilicate zeolite ZSM-12, which is described in detail in U.S. Pat. No. 3,832,449; crystalline aluminosilicate zeolite ZSM-35, which is described in detail in U.S. Pat. No. 4,016,245; and crystalline aluminosilicate zeolite ZSM-38, which is described in detail in U.S. Pat. No. 4,046,859. All of the aforesaid patents are incorporated herein by reference.

Mordenite-type crystalline aluminosilicate zeolites also can be present in the catalytic composition of the present invention. Suitable mordenite-type crystalline aluminosilicate zeolites are disclosed in U.S. Pat. No. 3,247,098 (Kimberline), U.S. Pat. No. 3,281,483 (Benesi et al.) and U.S. Pat. No. 3,299,153 (Adams et al.), each of which is incorporated herein by reference. Synthetic mordenite-structure crystalline aluminosilicate zeolites, such as those designated Zeolon and available from the Norton Company of Worcester, Massachusetts, also are contemplated according to the invention.

Synthetic crystalline molecular sieve zeolites often are synthesized in alkali metal form, i.e., having alkali metal cations associated with framework species. For purposes of the present invention, the original form as well as various exchanged forms such as the hydrogen (acid), ammonium and metal-exchanged forms are suitable. Crystalline molecular sieve zeolites can be converted to acid form by exchange with acids or by indirect means which typically involve contacting with ammonium or amine salts to form ammonium-exchanged intermediate species which can be calcined to acid form. Metal-exchanged zeolites are well known as are methods for preparation thereof. Typically, zeolite is contacted with a solution or solutions containing metal cations capable of associating with framework metallic species. As noted hereinabove, crystalline molecular sieve zeolite components present in the catalysts of the present invention contain only insubstantial levels of metals capable of reacting with aqueous phosphoric acid to form insoluble metal phosphates capable of plugging the pores of the support component. Accordingly, preferred metal-exchanged crystalline molecular sieve zeolites are those in which the exchanged metals are nickel, cobalt, iron or a Group VIII noble metal. In catalysts intended for use in hydrogen processing of petroleum or synthetic crude oils, coal or biomass liquids, or fractions thereof, preferred crystalline molecular sieve zeolite components of the invented catalysts are those in acid or polyvalent metal ion-exchanged form, and especially the former.

Content of non-zeolitic, porous refractory inorganic oxide matrix component and crystalline molecular sieve zeolite component in the support component of the invented composition are not critical. Broadly, the matrix component constitutes about 5 to about 95 wt % of the support, and likewise, the zeolite component can constitute about 5 to about 95 wt % of the support. Preferably, the content of the non-zeolitic matrix component is at least about 10 wt % in order to ensure that the support component will exhibit sufficient strength and physical integrity to allow shaping of the component or final catalyst into a form suitable for intended use. Of course, even at less than about 10 wt % matrix component, suitable catalytic performance can be attained in applications amenable to use of catalyst in finely divided form.

In terms of overall weight of the invented catalytic composition, preferred matrix content ranges from about 10 to about 90 wt % and preferred zeolite content ranges from about 5 to about 90 wt %. Within these ranges, precise levels of matrix and zeolite components that are more preferred for a given catalyst will vary depending on intended use.

The support component of the invented catalytic composition can be prepared by any suitable method. A preferred method comprises blending acid-tolerant zeolitic component, preferably in finely divided form, into a sol, hydrosol or hydrogel of at least one inorganic oxide and adding a gelling medium such as ammonium hydroxide with stirring to produce a gel. It also is contemplated to add the zeolite component to a slurry of the matrix component. In either case, the result can be dried, shaped if desired, and then clacined to form the support component. Suitable drying temperatures range from about 80° to about 350° F. (about 27° to about 177° C.) and suitable drying times range from seconds to several hours. Calcination preferably is conducted at a temperature of about 800° to about 1,200° F. (about 427° to about 649° C.) for about ½ to about 16 hours. Shaping of the support component can be conducted if desired, preferably after drying or calcining.

Another suitable method for preparing the support component of the invented composition comprises physically mixing particles of the matrix and zeolite components, each preferably in finely divided form, followed by thorough blending of the mixture.

The invented catalytic composition is prepared by a method comprising (1) impregnating the above-described support component with precursors to the active metallic component under conditions effective to retain substantial zeolite crystallinity; and (2) calcining the result.

Impregnation of support component with precursors to the active metallic component can be conducted in a single step or in a series of separate steps which may be separated by drying and/or calcination steps, provided that impregnation with at least one metal precursor takes place prior to or simultaneously with impregnation with phosphorus component precursor. If the active metallic component contains more than one metal, precursors can be impregnated simultaneously, in sequence or by various combinations of simultaneous and sequential impregnations. Phosphorus component precursor or precursors can be included with one or more of the metal precursors, or one or more separate phosphorus component precursor impregnation steps can be included between or after the metal precursor impregnation steps. It also is contemplated to impregnate either the porous refractory inorganic oxide matrix component or the zeolitic component with precursors to the active metallic component and blend the result with the other component.

The mechanics of impregnating a support with metallic component precursors are well known to persons skilled in the art and typically involve contacting a support with one or more solutions of one or more precursors in amounts and under conditions effective to yield a final composition containing the desired amount of metal or metals. Suitable solvents for the impregnating solution or solutions include water and various low boiling alcohols in which the precursors are soluble. Water is preferred over alcohols from the standpoint of cost. In the case of simultaneous impregnations of metal and phosphorus component precursors a more preferred solvent is aqueous phosphoric acid.

Metal precursors useful in preparation of the invented catalytic compositions are well known to persons skilled in the art and include a wide range of salts and compounds of the metals that are soluble in the impregnating solvent and convertible to the desired form on calcination. Examples of useful salts include organic acid salts such as acetates, formates and propionates; nitrates; anhydrides; sulfates; and ammonium salts.

Useful precursors to the oxygenated phosphorus component are materials capable of reaction with the metal or metals of the metallic component, or compounds of such metal or metals, or precursors thereto, so as to incorporate into the metallic component or metallic component precursor a phosphorus-containing species that can be converted to an oxygenated phosphorus component. From the standpoint of maximizing the promotional effect of the oxygenated phosphorus component, the preferred phosphorus component precursor is one containing or capable of liberating phosphate anions as these are sufficiently reactive with the metal or metal precursors to yield the desired promotional effect. Specific examples of such phosphorus anion sources include phosphoric acid and salts thereof such as ammonium dihydrogen phosphate and diammonium hydrogen phosphate. Other phosphorus component precursors contemplated according to the invention, though less preferred from the standpoint of attaining maximum promotional effect, include organophosphorus compounds such as partial and full esters of the aforesaid oxyacids such as organophosphates and organophosphites; other organophosphorus compounds such as phosphines; and other phosphoric oxyacids such as phosphorus and phosphinic acids.

Impregnation of the support component with precursors to the metallic component is conducted under conditions effective to avoid substantial destruction of crystallinity of the crystalline molecular sieve zeolite component. Preferably, such conditions include a temperature that is high enough to maintain the metal and/or phosphorus component precursors in solution in the impregnating solvent though not so high as to decompose such precursors or have substantial adverse effects on the support component. More preferably, impregnating temperatures range from about 40° to about 200° F. pH of the impregnating solution or solutions to be used also is important from the standpoint of insuring retention of substantial zeolite crystallinity when phosphoric acid or other phosphate anion source is employed as a phosphorus component precursor and/or impregnating solvent. In such cases, pH preferably is sufficiently high that only insubstantial destruction of zeolite crystallinity takes place during the preparation. Of course, the precise pH at which substantial decomposition of crystallinity will occur will vary somewhat depending upon the choice of zeolite component. In general, however, pH should be above about 2 in order to insure retention of sufficient zeolite crystallinity to insure desirable catalytic performance. Most preferably, pH ranges from about 2.5 to about 6 in order to insure retention of a high degree of zeolite crystallinity while also insuring the desired association of the phosphorus and metal components of the active metallic component.

Following impregnation of the support component with metallic component precursors, it is preferred to dry the impregnated support. It also is contemplated to dry the support subsequent to any intermediate impregnating steps in a multi-step impregnation. Preferred drying temperatures range from about 80° to about 350° F. (about 27° to about 177° C.), with preferred drying times ranging from a few seconds in spray drying operations to several hours in conventional driers.

Following impregnation of the support with precursors to the metallic component and any optional drying steps, the impregnated support is subjected to calcination in order to convert at least a portion of the metal or metals of the metallic component to the active form and to convert phosphorus precursors to oxygenated phosphorus component. Calcination is conducted in an atmosphere containing molecular oxygen at a temperature and for a period of time effective to attain the desired conversion. Preferably, calcination temperatures range from about 800° to about 1,200° F. (about 427° to about 649° C.). Preferred calcination times range from about ½ to about 16 hours.

As a result of the above-described preparation, there is attained a catalytic composition comprising (1) a metallic component comprising at least one metal having hydrocarbon conversion activity and at least one oxygenated phosphorus component, and (2) a support component comprising at least one non-zeolitic, refractory inorganic oxide matrix component and at least one crystalline molecular sieve zeolite component. Preferred compositions are those in which the zeolite component exhibits at least about 40% crystallinity as compared to compositions identical but for inclusion of phosphorus component. More preferably, such relative crystallinity is at least about 75% in order to ensure desirable catalyst performance.

The compositions of this invention have utility in a wide range of hydrocarbon conversion processes in which a chargestock comprising hydrocarbon is contacted with the catalyst under hydrocarbon conversion conditions. The invented catalysts are particularly useful in processes for hydrogen processing of hydrocarbon feed materials such as whole petroleum or synthetic crude oils, coal or biomass liquids, and fractions thereof. The process of the invention is described in further detail with reference to hydrogen processing of such feed materials.

Petroleum and synthetic crude oil feeds that can be hydrogen processed according to this aspect of the invention include whole petroleum, shale and tar sands oils, coal and biomass liquids and fractions thereof such as distillates, gas oils and residual fractions.

Such feed materials are contacted with the catalyst of the invention under hydrogen processing conditions which will vary depending upon the specific feed to be processed as well as the type of processing desired. Broadly, hydrogen treating temperatures range from about 350° to about 850° F. (about 177° to about 455° C.), hydrogen pressures range from about 100 to about 3,000 psig (about 7 to about 210 kg/m$^2$) and feed linear hourly space velocities range from about 0.1 to about 10 volumes of feed per volume of catalyst per hour. Hydrogen addition rate generally ranges from about 200 to about 25,000 standard cubic feet per barrel (SCFB).

Examples of specific hydrogen treating processes employing the catalysts of this invention include hydrocracking of gas oil boiling range hydrocarbons to gasoline boiling range products as disclosed in the aforesaid, copending, commonly assigned U.S. Pat. No. 4,431,516 of Baird et al.; mild hydrocracking processes such as catalytic dewaxing and catalytic cracker feed hydrocracking as disclosed in the aforesaid commonly assigned U.S. Pat. No. 4,431,517 of Nevitt et al; and denitrogenation and/or hydrocracking of high nitrogen feeds as disclosed in the aforesaid, commonly assigned U.S. Pat. No. 4,431,527 of Miller et al. and commonly assigned U.S. Pat. No. 4,406,779 of Hensley filed concurrently herewith.

The present invention is described in further detail in the following examples, it being understood that the same are for purposes of illustration and not limitation.

EXAMPLE 1

A support component containing 30 wt. % ultrastable Y-type crystalline aluminosilicate zeolite obtained from the Davison Chemical Division of W. R. Grace and Co. dispersed in 70 wt. % alumina was prepared by mixing 15,890 g alumina sol (10.0 wt. % alumina dry weight) with 681 g ultrastable Y-type zeolite. To the result was added a solution of 400 ml water and 400 ml concentrated NH$_4$OH while stirring rapidly to form a gel. The resulting gel was dried overnight at 250° F. in air, ground to 100 mesh, mulled with water, extruded to 5/64" particles, dried overnight at 250° F. in air and calcined at 1000° F. in air for three hours.

A solution prepared by dissolving 8.30 g $(NH_4)_2Cr_2O_7$ in 49 ml water was added to 72.77 g of support component and allowed to stand for 1 hour after which the result was dried in air at 250° F. for 1 hour.

Subsequently, 18.40 g $(NH_4)_6Mo_7O_{24}.4H_2O$, 5.85 g $Co(NO_3)_2.6H_2O$ and 8.6 g 85% phosphoric acid $(H_3PO_4)$ were dissolved in 35 ml water to form an impregnating solution having a pH of about 3. The impregnating solution was added to the chromia-impregnated support and the mixture was allowed to stand for 1 hour after which the result was dried in air at 250° F. for 1 hour and calcined in air at 1000° F. for 1 hour.

The resulting catalyst contained 5.0 wt. % $Cr_2O_3$, 15.0 wt. % $MoO_3$, 1.5 wt. % CoO and 5.5 wt. % oxygenated phosphorus component, calculated as $P_2O_5$.

EXAMPLE 2

A support component containing 50 wt. % ultrastable Y-type crystalline aluminosilicate zeolite (Davison) dispersed in 50 wt. % alumina was prepared substantially according to the procedure of Example 1 using 3863 g alumina sol (10 wt. % alumina) and 386.5 g ultrastable Y-type zeolite.

A solution prepared by dissolving 16.6 g $(NH_4)_2Cr_2O_7$ in 90 ml water was added to 148.98 g of the support component and allowed to stand for 1 hour. The result was dried in air at 250° F. for 1 hour and calcined in air at 1000° F. for 1 hour.

Subsequently, 36.8 g $(NH_4)Mo_7O_{24}.4H_2O$, 11.70 g $Co(NO_3)_2.6H_2O$ and 13.02 g 85% $H_3PO_4$ were dissolved in 67 ml water to form an impregnating solution having a pH of about 3. This solution was added to the chromia-impregnated support and the result was allowed to stand for 1 hour after which the result was dried in air at 250° F. for 1 hour and calcined in air at 1000° F. for 1 hour.

The resulting catalyst contained 5.0 wt. % $Cr_2O_3$, 15.0 wt. % $MoO_3$, 1.5 wt. % CoO and 4.0 wt. % oxygenated phosphorus component, calculated as $P_2O_5$.

EXAMPLE 3

An impregnating solution having a pH of about 5.0 was prepared by dissolving 34.80 g cobalt nitrate, 42.45 g ammonium molybdate and 16.63 g phosphoric acid in 600 ml distilled water, after which total volume of the solution was brought to 660 ml with distilled water. The impregnating solution was added to 331 g of a premixed support component containing 41 wt. % ultrastable Y-type crystalline aluminosilicate zeolite and 59 wt. % silica-alumina and stirred vigorously for a short time. The result was dried in air at 250° F. for several hours, ground to pass a 28 mesh screen, formed into ⅛" pellets and calcined in air for 1 hour at 500° F., for 1 hour at 750° F. and for 5 hours at 1000° F.

The resulting catalyst contained 9.13 wt. % $MoO_3$, 2.36 wt. % CoO and 2.3 wt. % phosphorus component, calculated as $P_2O_5$.

EXAMPLE 4

A support component containing 35 wt. % ultrastable Y-type crystalline aluminosilicate zeolite (Davison) dispersed in 65 wt. % silica-alumina containing 71.7 wt. % silica was prepared in two batches by blending 4160 g of silica-alumina slurry containing about 2.5 wt. % solid with 54.4 g of the zeolite component for about 5 to 10 minutes and then filtering, drying the solid in air at 250° F. overnight, grinding the dried solid to pass through a 30-mesh screen and calcining in air at 1000° F. for 3 hours.

An impregnating solution was prepared by dissolving 35.4 g cobalt nitrate, 41.6 g ammonium molybdate and 4.6 g phosphoric acid in 472 ml distilled water. 290 g of the support component were contacted with the impregnating solution after which the result was dried in air at 250° F. overnight, ground to 28 mesh, formed into ⅛" pills and calcined in air at 500° F. for 1 hour, at 700° F. for 1 hour and at 1000° F. for 5 hours.

The resulting catalyst contained 2.6 wt. % CoO, 9.6 wt. % $MoO_3$ and 0.6 wt. % oxygenated phosphorus component, calculated as $P_2O_5$.

EXAMPLE 5

147.84 g support component containing 20 wt. % AMS-type crystalline borosilicate zeolite dispersed in 80 wt. % alumina was impregnated with a solution prepared by dissolving 22.09 g $(NH_4)_2Mo_7O_{24}.4H_2O$ and 13.63 g $Ni(NO_3)_2.6H_2O$ in 68 ml distilled water and adding dropwise 7.44 g 85% $H_3PO_4$ thereto while stirring. A small amount of water was added to the impregnation mixture and the result was allowed to stand for 1 hour. The result was dried in air at 250° F. overnight, and then impregnated with 22.09 g $(NH_4)_2Mo_7O_{24}.4H_2O$, 13.63 g $Ni(NO_3)_2.6H_2O$, and 7.44 g 85% $H_3PO_4$ in 68 ml distilled water. The result was allowed to stand for 2 hours, dried in air at 250° F. and calcined at 1000° F.

The resulting catalyst contained 17.70 wt. % $MoO_3$, 3.44 wt. % NiO and 4.35 wt. % oxygenated phosphorus component, calculated as $P_2O_5$, and had a surface area of 242 $m^2/g$ and pore volume of 0.4802 cc/g.

EXAMPLE 6

The catalysts prepared in Examples 1 and 2 were tested for denitrogenation and hydrocracking activity in an automated processing unit that included a vertical, tubular, downflow reactor having a length of 32" and inner diameter of ¼". The unit included automatic controls to regulate hydrogen pressure and flow, temperature and feed rate. Catalyst was ground to 14–20 mesh and loaded into a 10–12" segment of the reactor and sulfided therein by passing, 8 vol. % $H_2S$ in hydrogen over the catalyst at 300 psi for 1 hour at 300° F. followed by 1 hour at 400° F. and then 1 hour at 700° F. The reactor then was heated to operating temperature, pressured with hydrogen and a high nitrogen feed generated in situ from oil shale was pumped into the reactor using a Ruska pump. The feed had the following properties:

| API Gravity (°) | 23.8 |
|---|---|
| Nitrogen (wt. %) | 1.27 |
| Sulfur (wt. %) | 0.65 |
| Oxygen (wt. %) | 1.40 |
| Pour Point (°F.) | 60 |
| Simulated Distillation (%) | |
| IBP–360° F. | 2.0 |
| 360–650° F. | 42.5 |
| 650° F.+ | 55.5 |

Operating conditions and results for each run are shown in Table 1. In addition to runs with the catalysts from Examples 1 and 2, comparative runs were conducted using comparative catalysts A–C which were prepared according to the general procedure of Examples 1 and 2 but without the use of phosphoric acid in the case of A and B and without a zeolite component in the case of C. Compositions of catalysts A–C were as follows:

(A) 10.0 wt. % $Cr_2O_3$, 15.0 wt. % $MoO_3$ and 1.5 wt. % CoO supported on a dispersion of 30 wt. % ultrastable Y-type crystalline aluminosilicate zeolite (Davison) in 70 wt. % alumina;

(B) 10.0 wt. % $Cr_2O_3$, 15.0 wt. % $MoO_3$ and 1.5 wt. % CoO supported on a dispersion of 50 wt. % ultrastable Y-type crystalline aluminosilicate zeolite dispersed in 50 wt. % alumina;

(C) 5.0 wt. % $Cr_2O_3$, 15.0 wt. % $MoO_3$, 1.5 wt. % CoO and 4.6 wt. % oxygenated phosphorus component, calculated as $P_2O_5$, supported on alumina.

TABLE 1

| Catalyst | 1 | A | 2 | B | C |
|---|---|---|---|---|---|
| Temp (°F.) | 760 | 760 | 780 | 780 | 760 |
| Pressure (psi) | 1800 | 1800 | 1800 | 1800 | 1800 |
| LHSV (hour$^{-1}$) | 0.5 | 0.5 | 0.5 | 0.5 | 0.5 |
| Days on Oil | 6 | 9 | 7 | 6 | 6 |
| Liquid Product (g) | 184 | 239 | 124 | 190 | 198 |
| API Gravity (°) | 40.0 | 36.5 | 49.4 | 49.6 | 37.0 |
| Pour Point (°F.) | 70 | 80 | −40 | −15 | 75 |
| Sulfur (ppm) | 2 | 110 | 6 | 262 | 57 |
| Nitrogen (ppm) | 1.7 | 173 | 0.7 | 3 | 85 |
| Simulated Distillation (%) | | | | | |
| IBP–350° F. | 14.5 | 10.7 | 44.5 | 42.0 | 9.0 |
| 350–650° F. | 60.0 | 54.3 | 53.0 | 52.6 | 55.0 |
| 650° F.+ | 25.5 | 35.0 | 2.5 | 5.4 | 36.0 |

As can be seen from the table, catalysts 1 and 2 according to the invention exhibited superior denitrogenation and desulfurization activity as compared to all three comparative catalysts. Further, cracking activities of catalysts 1 and 2 were superior to those of comparative catalysts A and B, respectively, as evidenced by the simulated distillation data showing reduced 650° F. content. Cracking activities of 1 and 2 also were superior to that of catalyst C which lacked a zeolite component.

EXAMPLE 7

The catalysts prepared in Examples 3 and 4 were tested for hydrocracking activity in a vertical, tubular, downflow reactor having a length of 19½" and inner diameter of 0.55" and equipped with a pressure gauge and DP cell to control hydrogen flow and a high pressure separator for removal of products. The reactor was loaded with 18.75 g catalyst, immersed in a molten salt-containing heating jacket at 500° F. and pressured to 1250 psi with hydrogen. Temperature was held at 500° F. for two hours and then feed was pumped to the reactor with a Milton Roy pump. Temperature was slowly increased to 680° F., held there overnight and then raised to operating temperature of 710°–730° F. Feed rate (LHSV) was 1–2 hr$^{-1}$. Runs were conducted for two weeks with periodic sampling.

The feed used in all runs was a mixture of 70 wt. % light catalytic cycle oil and 30 wt. % light virgin gas oil having the following properties:

| API Gravity (°) | 25.3 |
|---|---|
| Nitrogen (ppm) | 304 |
| Sulfur (wt. %) | 1.31 |
| Initial Boiling Point (°F.) | 404 |

-continued

| Final Boiling Point (°F.) | 673 |
|---|---|

In addition to the runs conducted using the catalysts of Examples 3 and 4, comparative runs were conducted using comparative catalysts A–C which are described below:

(A) 2.5 wt. % CoO and 10.2 wt. % $MoO_3$ supported on a dispersion of 35 wt. % ultrastable Y-type crystalline aluminosilicate zeolite in 65 wt. % alumina prepared substantially according to the procedure of Example 3;

(B) commercial hydrocracking catalyst containing 2.63 wt. % CoO and 10.5 wt. % $MoO_3$ supported on the base used in Example 3 obtained from the Davison Chemical Division of W. R. Grace and Co.;

(C) 2.6 wt. % CoO and 10.0 wt. % $MoO_3$ supported on a dispersion of 35 wt. % ultrastable Y-type crystalline aluminosilicate zeolite (Davison) in 65 wt. % alumina and prepared substantially according to the procedure of Example 4.

Hydrocracking activities of the catalysts were determined on the basis of temperature required to convert 77 wt. % of the feed to gasoline boiling range products (up to 380° F.). Activities relative to comparative catalyst C are reported in Table 2.

TABLE 2

| CATALYST | RELATIVE ACTIVITY | INCREASE (%) |
|---|---|---|
| A | 102 | 2 |
| B | 126 | 26 |
| 3 | 144 | 44 |
| C | 100 | — |
| 4 | 138 | 38 |

As can be seen from the table, the phosphorus-promoted, zeolite-containing catalysts of the invention exhibited significantly improved hydrocracking activity as compared to the comparative catalysts.

EXAMPLE 8

Activity of the catalyst of Example 5 for mild hydrocracking was tested in an automated pilot plant consisting of a downflow, vertical pipe reactor of about 30" length and ⅜" inner diameter equipped with four independently wired and controlled heaters, a pressure step down and metering device for introduction of hydrogen and an outlet pressure control loop to control withdrawal of hydrogen. The catalyst of Example 5 was calcined in air at 1000° F. for about 2 hours and then screened to 14–20 mesh. The reactor was loaded to a height of twelve inches with glass balls after which about ten inches were loaded with 16 cm$^3$ of catalyst. Glass balls were added to fill the reactor.

The reactor was heated 300° F. and a gaseous mixture of 8 vol % $H_2S$ in hydrogen was passed over the catalyst at 200 psi and 0.8 ft$^3$/hr. After an hour, temperature was raised to 400° F., and after another hour, to 700° F. After one hour at 700° F., flow of the gaseous mixture was discontinued and a hydrogen flow of 12000 SCFB at 1200 psi was begun. Heavy vacuum gas oil was pumped to the reactor at 10.2 cc/hr using a positive displacement pump. After passage through the reactor, product exited the reactor through a high pressure gas-liquid separator via a valve with a control loop designed to maintain a constant liquid level in the high pressure separator. Feed properties were as follows:

| | |
|---|---|
| API Gravity (°) | 18.6 |
| Pour Point (°F.) | 110 |
| Viscosity (cst at 100° C.) | 11.68 |
| Carbon (wt. %) | 84.94 |
| Hydrogen (wt. %) | 11.63 |
| Nitrogen (wt. %) | 0.166 |
| Sulfur (wt. %) | 2.98 |
| Simulated Distillation (°F.) | |
| IBP | 409 |
| 5% | 671 |
| 10% | 727 |
| 20% | 788 |
| 40% | 863 |
| 60% | 918 |
| 80% | 977 |
| 90% | 1000+ |
| Paraffins (wt. %) | 19.7 |
| Naphthenes (wt. %) | 34.7 |
| Monoaromatics (wt. %) | 12.6 |
| Polyaromatics and Heterocyclics (wt. %) | 33.0 |

In addition to the catalyst from Example 5, a comparative catalyst (A) containing 3.5 wt. % NiO, 10 wt. % $Cr_2O_3$ and 15 wt. % $MoO_3$ supported on a dispersion of 20 wt. % rare earth-exchanged ultra-stable Y-type zeolite in 80 wt. % alumina was tested. Another run was conducted using a catalyst (B) containing 20 wt. % $MoO_3$, 3.5 wt. % NiO and 3.0 wt. % oxygenated phosphorus component, calculated as $P_2O_5$, supported on alumina.

Operating conditions and results are shown in Table 3.

EXAMPLE 9

A series of catalyst compositions was prepared from various crystalline molecular sieve zeolite and matrix components and aqueous phosphoric acid solutions of various metal salts (pH about 3) according to the general procedure of Examples 1-5. A second series of catalysts was prepared in similar fashion to contain identical levels of metals and support components but no phosphorus (PH about 5).

Samples of the catalysts were anlayzed by X-ray diffraction to determine the effect of phosphoric acid on retention of zeolite crystallinity. For each pair of catalysts (with and without phosphoric and impregnation) of identical metals and support content, intensity of one or more X-ray bands characteristic of the zeolite component and not subject to interference by the metals of the catalysts were measured.

For each pair of catalysts, composition and crystallinity of the phosphorus component-containing catalyst relative to that of the phosphorus-free composition is reported in Table 4.

TABLE 4

| SAMPLE | COMPOSITION (wt. %) | RELATIVE CRYSTALLINITY (%) |
|---|---|---|
| A | 3.5% NiO, 18% $MoO_3$, 3.4% $P_2O_5$/ 50% USY[1], 50% $Al_2O_3$ | 86 |

TABLE 3

| RUN NO./SAMPLE NO. | 1/1 | 1/2 | 1/3 | 1/4 | 1/5 | 1/6 | 2/1 | 2/2 | 2/3 | 3/1 | 3/2 |
|---|---|---|---|---|---|---|---|---|---|---|---|
| CATALYST | 5 | 5 | 5 | 5 | 5 | 5 | B | B | B | A | A |
| TEMP (°F.) | 700 | 740 | 740 | 690 | 730 | 730 | 740 | 780 | 780 | 740 | 780 |
| PRESSURE (psi) | 1200 | 1200 | 1200 | 1200 | 1200 | 800 | 1200 | 1200 | 1200 | 1200 | 1200 |
| LHSV (hour$^{-1}$) | 0.625 | 0.625 | 0.625 | 0.625 | 0.625 | 0.625 | 0.68 | 0.68 | 0.68 | 0.625 | 0.625 |
| HYDROGEN (SCFB) | 12000 | 12000 | 12000 | 12000 | 12000 | 12000 | 12000 | 12000 | 12000 | 12000 | 12000 |
| HOURS ON OIL | 136 | 352 | 496 | 808 | 976 | 1312 | 128 | 320 | 488 | 110 | 158 |
| API GRAVITY (°) | 28.0 | 33.6 | 32.9 | 26.6 | 30.3 | 28.2 | ND* | 32.5 | 33.2 | 29.7 | 30.3 |
| POUR POINT (°F.) | 80 | −70 | −60 | 95 | 30 | 55 | 100 | 100 | 90 | 105 | 100 |
| VISCOSITY (cst at 100° C.) | 4.71 | 2.51 | 2.55 | 6.07 | 3.88 | 3.89 | ND | 2.10 | 2.30 | 3.84 | 2.98 |
| CARBON (wt. %) | 87.00 | 86.90 | 87.05 | 87.09 | 87.02 | 87.26 | 86.78 | 86.97 | 87.06 | 87.01 | 87.16 |
| HYDROGEN (wt. %) | 12.93 | 13.09 | 12.94 | 12.80 | 12.96 | 12.66 | 13.19 | 13.02 | 12.93 | 12.97 | 12.82 |
| SULFUR (ppm) | 633 | 137 | 86 | 660 | 88 | 368 | 240 | 70 | 16 | 102 | 79 |
| NITROGEN (ppm) | 135 | 8.8 | 14 | 409 | 29 | 338 | 22 | 3 | 1 | 76 | 137 |
| SIMULATED DISTILLATION | | | | | | | | | | | |
| IBP | 114 | 0 | −15 | 409 | ND* | ND | 1.87 | 97 | 147 | 9 | 151 |
| 5% | 329 | 165 | 168 | 584 | ND | ND | 343 | 244 | 267 | 364 | 322 |
| 20% | 631 | 427 | 448 | 716 | ND | ND | 572 | 440 | 462 | 606 | 558 |
| 50% | 797 | 696 | 707 | 830 | ND | ND | 769 | 656 | 678 | 786 | 753 |
| 80% | 907 | 860 | 863 | 928 | ND | ND | 896 | 827 | 841 | 905 | 882 |
| 95% | 990 | 967 | 961 | 999 | ND | ND | 985 | 931 | 941 | 990 | 969 |
| % DESULFURIZATION | 97.9 | 99.5 | 99.7 | 97.7 | 99.7 | 98.7 | 99.2 | 99.8 | 99.9 | 99.7 | 99.1 |
| % DENITROGENATION | 91.9 | 99.5 | 99.2 | 60.2 | 98.2 | 79.6 | 98.7 | 99.8 | 99.9 | 95.3 | 91.6 |
| HYDROGEN CONSUMED (SCFB) | 795 | 1045 | 940 | 700 | 930 | 635 | 990 | 940 | 870 | 825 | 890 |
| YIELD (wt. %) | | | | | | | | | | | |
| IBP–360° F. | 5.5 | 14.8 | 13.6 | 0 | ND | ND | 5.6 | 12.0 | 11.4 | 4.8 | 6.0 |
| 360–650° F. | 17.9 | 25.7 | 24.7 | 10.4 | ND | ND | 22.9 | 37.2 | 34.3 | 20.1 | 23.3 |
| 650° F.+ | 75.4 | 53.9 | 55.3 | 88.9 | ND | ND | 70.1 | 48.0 | 51.6 | 74.0 | 64.9 |

*ND stands for not determined.

As can be seen from the table, all three catalysts exhibited high desulfurization activity and catalysts 5 and B showed good denitrogenation. Cracking activity, as indicated by the yield data, was generally comparable for catalysts 5 and B, both of which were superior to catalyst A. Catalyst 5 was superior to both comparative catalysts in terms of selective cracking of waxy components as evidenced by the reductions in pour point in runs using catalyst 5. Catalyst 5 also was superior in terms of overall performance in that comparable or better results were achieved with that catalyst at lower temperatures than those used in the comparative runs.

| | | |
|---|---|---|
| B | 3.5% NiO, 18% $MoO_3$, 3.4% $P_2O_5$/ 50% Y[2], 50% $Al_2O_3$ | 78 |
| C | 3.5% NiO, 18% $MoO_3$, 3.4% $P_2O_5$/ 50% ZSM-5[3], 50% $Al_2O_3$ | 86 |
| D | 1.5% CoO, 10% $Cr_2O_3$, 15% $MoO_3$, 4.6% $P_2O_5$/40% HAMS-1B[4], 60% $Al_2O_3$ | 79 |
| E | 1.5% CoO, 10% $Cr_2O_3$, 15% $MoO_3$, | 88 |

TABLE 4-continued

| SAMPLE | COMPOSITION (wt. %) | RELATIVE CRYSTAL- LINITY (%) |
|---|---|---|
| | 4.6% $P_2O_5$/30% USY, 70% $Al_2O_3$ | |

(1) Ultrastable Y-type crystalline aluminosilicate zeolite.
(2) Y-type crystalline aluminosilicate zeolite.
(3) Crystalline aluminosilicate zeolite ZSM-5.
(4) Crystalline borosilicate zeolite HAMS-1B.

As can be seen, crystallinity of the compositions according to the invention was quite high relative to compostions identical but for inclusion of phosphoric acid in preparation. 3.5% NiO, 18.0% $MoO_3$, 3.5% $P_2O_5$/30% USY, 70% $Al_2O_3$ exhibited 66% crystallinity relative to a dispersion of 30% USY in 70% $Al_2O_3$.

We claim:

1. A hydrocarbon conversion process comprising contacting a chargestock comprising whole petroleum, shale oil, tar sand oil, coal and biomass liquids and fractions thereof, under hydrocarbon conversion conditions comprising a temperature of 350° F. to 850° F., a hydrogen pressure of 100 to 3,000 psig and a space velocity of 0.1 to 10 volumes of feed per volume of catalyst per hour, in the presence of a catalytic composition comprising (1) an active metallic component comprising at least one metal having hydrocarbon conversion activity and at least one oxygenated phosphorus component, and (2) a support component comprising at least one non-zeolitic, porous refractory inorganic matrix component and at least one crystalline molecular sieve zeolite component comprising a crystalline borosilicate zeolite or a crystalline aluminosilicate zeolite selected from the group consisting of ultrastable Y crystalline aluminosilicate zeolites and Y crustalline aluminosilicates in acid form or mixtures thereof.

2. A hydrogen processing process comprising contacting a whole petroleum or synthetic crude oil, coal or biomass liquid, or a fraction thereof with hydrogen under hydrogen processing conditions comprising a temperature of 350° F. to 850° F., a hydrogen pressure of 100 to 3,000 psig and a space velocity of 0.1 to 10 volumes of feed per volume of catalyst per hour, in the presence of a catalytic composition comprising (1) an active metallic oomponent comprising at least one metal having hydrogenation activity and at least one oxygenated phosphorus component, and (2) a support component comprising at least one non-zeolitic, porous refractory inorganic oxide matrix component and at least one crystalline molecular sieve zeolite component comprising a crystalline borosilicate zeolite or a crystalline aluminosilicate zeolite selected from the group consisting of ultrastable Y crystalline aluminosilicate zeolites and Y crystalline aluminosilite zeolites in acid form or mixtures therof.

* * * * *

UNITED STATES PATENT OFFICE
CERTIFICATE OF CORRECTION

Patent No. 4,483,764     Dated November 20, 1984

Inventor(s): HENSLEY, ALBERT L., Jr. - MILLER, JEFFREY T. - NEVITT, THOMAS D. - TAIT, A. MARTIN It is certified that error appears in the above-identified patent and that said Letters Patent are hereby corrected as shown below:

| Column | Line | | |
|---|---|---|---|
| 4 | 33 | " 438 " | should be -- '438 -- |
| 8 | 36 | " clromium " | should be -- chromium -- |
| 17 | 40 | After "650°F" | Add -- + -- |
| 20 | 16 | " and " | should be -- acid -- |
| 22 | 2 | After "inorganic" | Add -- oxide -- |

Signed and Sealed this

Second Day of July 1985

[SEAL]

Attest:

DONALD J. QUIGG

Attesting Officer     Acting Commissioner of Patents and Trademarks